(12) United States Patent
Yoshida

(10) Patent No.: US 7,086,835 B2
(45) Date of Patent: Aug. 8, 2006

(54) HORIZONTAL AXIS WIND TURBINE AND METHOD FOR CONTROLLING HORIZONTAL AXIS WIND TURBINE

(75) Inventor: Shigeo Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 178 days.

(21) Appl. No.: 10/911,433

(22) Filed: Aug. 4, 2004

(65) Prior Publication Data

US 2005/0042093 A1    Feb. 24, 2005

(30) Foreign Application Priority Data

Aug. 7, 2003    (JP)    ............................. 2003-288936

(51) Int. Cl.
    *F03D 7/04*    (2006.01)

(52) U.S. Cl. .............................. 416/9; 416/41; 416/61; 415/4.3; 73/170.01

(58) Field of Classification Search ............ 416/1, 416/9, 23, 31, 35, 41, 61, 197 A; 415/2.1, 415/4.1, 4.3, 4.5, 14
See application file for complete search history.

(56) References Cited

U.S. PATENT DOCUMENTS

| | | | |
|---|---|---|---|
| 3,686,937 A | * | 8/1972 | Corey ..................... 73/170.14 |
| 4,024,761 A | | 5/1977 | Djorup |
| 4,550,259 A | | 10/1985 | Bertels |

FOREIGN PATENT DOCUMENTS

| | | |
|---|---|---|
| DE | 858 530 | 12/1952 |
| EP | 0 083 819 | 7/1983 |

OTHER PUBLICATIONS

Nordex AG "Products & Service Onshore N50," 2 pages, Nordex AG, online file://c:¥My%20Documents¥task¥F1063¥IDS1,htm.

* cited by examiner

*Primary Examiner*—Edward K. Look
*Assistant Examiner*—Richard A. Edgar
(74) *Attorney, Agent, or Firm*—Smith, Gambrell & Russell

(57) ABSTRACT

A horizontal axis wind turbine includes: a yaw sensor; a rotor rotating around a rotor axis extending in a substantially horizontal direction, the rotor axis rotating in a substantially horizontal plane depending on wind direction; a plate-like member disposed on a rotational central portion of the rotor and extending in a parallel direction to the rotor axis and in a vertical direction; two anemometers disposed at positions which are across the plate-like member; and a controller for yaw control based on a difference or a ratio between wind speeds measured by the two anemometers.

20 Claims, 4 Drawing Sheets

HORIZONTAL AXIS WIND TURBINE AND METHOD FOR CONTROLLING HORIZONTAL AXIS WIND TURBINE

BACKGROUND OF THE INVENTION

1. Field of the Invention

The present invention relates to a horizontal axis wind turbine and a method for controlling a horizontal axis wind turbine.

2. Description of Related Art

In recent years, horizontal axis wind turbines have been proposed and in practical use in order to generate electric power from natural wind. Such a horizontal axis wind turbine is provided with an anemometer for measuring the wind speed blowing against a rotor (wind speed) and a yaw sensor, such as a yaw vane, for measuring the direction of the wind blowing against the rotor (wind direction). In the case that a value of the wind speed measured by the anemometer rises above a predetermined value, a control device of the horizontal axis wind turbine starts rotation of the rotor as well as rotates the rotor axis in a substantially horizontal plane in such a way that the rotor faces to the wind direction measured by the yaw sensor.

By the way, the control device of the horizontal axis wind turbine controls the rotor so as to stop a power generation action automatically when the anemometer or the yaw sensor breaks down and becomes unable to measure the wind speed or the yaw angle. In the case that the anemometer or the yaw sensor breaks down this way, much time and cost are required until recovery since horizontal axis wind turbines are generally installed in remote locations. If the stop period of power generation action is protracted, a loss of electric energy to be generated for the period becomes serious.

Therefore a plurality of anemometers and yaw sensors are provided for a breakdown of one anemometer (or one yaw sensor) in an earlier development. (For example, see Nordex AG, "Products & Service Onshore N50", [online], Nordex AG.

However provision of a plurality of anemometers and yaw sensors causes increase of cost for them. Therefore arts to prevent the stop of power generation action at low cost without employing a superfluous anemometer and yaw sensor have been longed for.

SUMMARY OF THE INVENTION

An object of the present invention is to provide a horizontal axis wind turbine that has a simple and inexpensive configuration yet a redundant function for measuring wind speed and direction, and is able to obviate the stop of power generation action to be caused by a breakdown of an anemometer or a yaw sensor.

In order to resolve the above-described problem, in accordance with the first aspect of the present invention, a horizontal axis wind turbine comprises:

a yaw sensor;

a rotor rotating around a rotor axis extending in a substantially horizontal direction, the rotor axis rotating in a substantially horizontal plane depending on yaw angle;

a plate-like member disposed on a rotational central portion of the rotor and extending in a parallel direction to the rotor axis and in a vertical direction;

two anemometers disposed at positions which are across the plate-like member; and a controller for controlling the yaw angle of the rotor based on a difference or a ratio between wind speeds measured by the two anemometers.

According to the first aspect of the invention, a plate-like member extending in the parallel direction to the rotor axis and in the vertical direction is disposed on the rotational central portion (hub) of the rotor, and two anemometers are disposed at positions which are across the plate-like member. Therefore in the case that the rotor is not facing opposite wind direction, it is possible to make a difference in the wind speeds measured by the two anemometers.

A controller controls the yaw angle of the rotor (the angle between the direction of the rotor axis and the yaw angle) based on the difference or the ratio between the wind speeds measured by two anemometers. For example, it is possible to estimate the yaw angle of the rotor based on the difference or the ratio between the wind speeds measured by two anemometers, and rotate the rotating axis of the rotor so that the yaw angle converges to about 0 degree (so as to make the rotor face opposite wind direction).

Therefore, even in the case of a breakdown of the yaw sensor, it is possible to make the rotor face to the wind direction with the two anemometers. Additionally, even if either anemometer is broken, the other anemometer can measure a wind speed because of employing two anemometers. Consequently, in spite of a simple and inexpensive configure, it is possible to obtain the same effect as the case of employing two yaw sensors and two anemometers and obviate the stop of the power generation action caused by a breakdown of a yaw sensor or an anemometer.

In the horizontal axis wind turbine, the controller may estimate the yaw angle of the rotor based on the difference or the ratio between the wind speeds measured by the two anemometers, and rotate the rotor axis so that the estimated yaw angle converges to about 0 degree.

The method for controlling the horizontal axis wind turbine may comprise:

estimating the yaw angle of the rotor based on the difference or the ratio between the wind speeds measured by the two anemometers;

and rotating the rotor axis so that the estimated yaw angle converges to about 0 degree.

According to the invention, the yaw angle of the rotor is estimated based on the difference or the ratio between the wind speeds measured by the two anemometers. Then it is possible to rotate the rotor axis so that the estimated yaw angle converges to about 0 degree (that is, so as to make the rotor face opposite the wind direction).

The method for controlling the horizontal axis wind turbine may comprise:

determining whether the difference between the wind speeds measured by the two anemometers is more than a predetermined threshold or not;

rotating the rotor axis to the anemometer that has measured a higher wind speed than other anemometer when the difference between the wind speeds exceeds the threshold; and stopping rotation of the rotor axis if the difference between the wind speeds falls not more than the threshold.

According to this invention, it is possible to achieve controlling the yaw angle of the rotor with an incredibly simple control law(control logic) using values of the wind speeds measured by the two anemometers.

In accordance with the second aspect of the present invention, a horizontal axis wind turbine comprises:

a rotor for rotating around a rotor axis extending in a substantially horizontal direction;

two anemometers;

a parting member disposed so that wind speeds measured by the anemometers are different except when a yaw angle of the rotor is substantially 0 degree; and a controller for controlling the yaw angle of the rotor based on the wind speeds measured by the two anemometer.

The wind turbine may further comprise a yaw sensor.

In the wind turbine, the parting member may be a plate-like member.

In the wind turbine, the controller may control the yaw angle of the rotor based on a difference between the wind speeds measured by the two anemometers.

In the wind turbine, the controller may control the yaw angle of the rotor based on a ratio between the wind speeds measured by the two anemometer.

In the wind turbine, the controller may compare the wind speeds measured by the two anemometers and rotate the rotor axis to one anemometer which measures a higher wind speed than other anemometer.

In the wind turbine, the controller may calculate a control determination value from the wind speeds measured by the two anemometers, determine whether the control determination value is within a predetermined range or not, rotate the rotor axis to an anemometer which measures a higher wind speed than other anemometer when the control determination value is out of the predetermined range, and stop rotation of the rotor axis when the control determination value comes within the range.

In the wind turbine, a difference or a ratio between wind speeds measured by the two anemometers may be used as the control determination value.

In the wind turbine, the controller may estimate the yaw angle of the rotor based on the wind speeds measured by the two anemometers, and rotate the rotor axis so that the estimated yaw angle converges to about 0 degree.

In the wind turbine, the controller may comprise:

a wind speed difference calculation unit for calculating a wind speed difference from wind speeds measured by the two anemometers;

a recording unit for recording wind speed difference correlation data showing relationship between the wind speed difference and the yaw angle;

a yaw angle estimation unit for estimating the yaw angle by using the wind speed difference calculated by the wind speed difference calculation unit and the wind speed difference correlation data recorded in the recording unit; and a yaw control unit for rotating the rotor axis so that the estimated yaw angle converges to about 0 degree.

In the wind turbine, the controller may comprise:

a wind speed ratio calculation unit for calculating a wind speed ratio from wind speeds measured by the two anemometers;

a recording unit for recording wind speed ratio correlation data showing relationship between the wind speed ratio and the yaw angle;

a yaw angle estimation unit for estimating the yaw angle by using the wind speed ratio calculated by the wind speed ratio calculation unit and the wind speed ratio correlation data recorded in the recording unit; and a yaw control unit for rotating the rotor axis so that the estimated yaw angle converges to about 0 degree.

A method for controlling the wind turbine may comprise:

comparing the wind speeds measured by the two anemometers; and rotating the rotor axis to an anemometer which measures a higher wind speed than other anemometer.

A method for controlling the wind turbine may comprise:

calculating a control determination value from wind speeds measured by the two anemometers;

determining whether the control determination value is within a predetermined range or not;

rotating the rotor axis to an anemometer which measures a higher wind speed than other anemometer when the control determination value is out of the predetermined range; and stopping rotation of the rotor axis when the control determination value comes in the range.

In the method for controlling the wind turbine, a difference or a ratio between wind speeds measured by the two anemometers is used as the control determination value.

A method for controlling the wind turbine may comprise:

measuring the wind speeds by the two anemometers;

calculating a wind speed difference from the wind speeds measured by the two anemometers;

estimating the yaw angle by using the wind speed difference calculated by the wind speed difference calculation unit and wind speed difference correlation data showing relationship the wind speed difference and the yaw angle; and rotating the rotor axis so that the estimated yaw angle converges to about 0 degree.

A method for controlling the wind turbine may comprise:

measuring the wind speeds by the two anemometers;

calculating a wind speed ratio from the wind speeds measured by the two anemometers;

estimating the yaw angle by using the wind speed ratio calculated by the wind speed ratio calculation unit and wind speed ratio correlation data showing relationship the wind speed ratio and the yaw angle; and rotating the rotor axis so that the estimated yaw angle converges to about 0 degree.

According to the present invention, it is possible to fulfill a redundant function for measuring a wind direction and speed with a simple and inexpensive configuration and to obviate the stop of power generation action caused by a breakdown of an anemometer or a yaw sensor by disposing two anemometers on the rotational central portion of a rotor in a horizontal axis wind turbine and a plate-like member between the two anemometers.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DETAILED DESCRIPTION OF THE PREFERRED EMBODIMENTS

Figure 1:
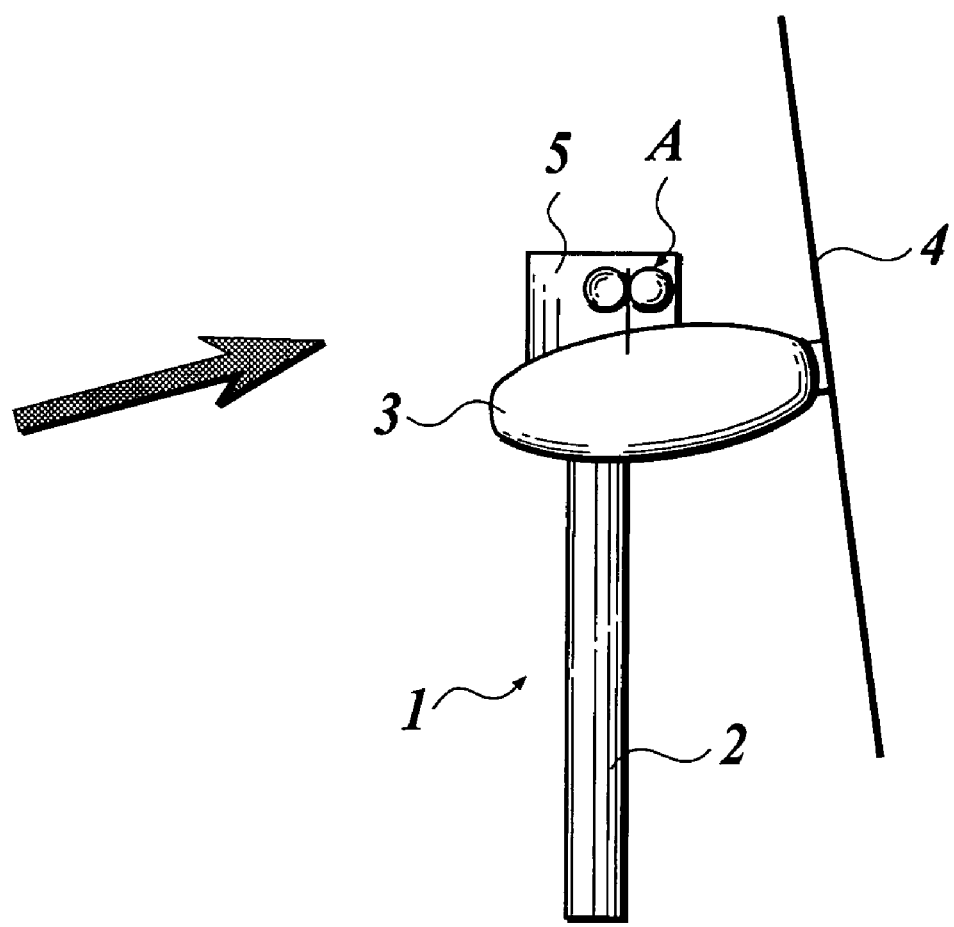
FIG. 1 is a schematic diagram showing a horizontal axis wind turbine according to an embodiment of the present invention.

Hereinbelow, an embodiment of the present invention will be described in detail with drawings. In the present embodiment, a downwind horizontal axis wind turbine 1 shown in FIG. 1 is adopted as an example of a horizontal axis wind turbine.

First, a configuration of the horizontal axis wind turbine 1 according to the present embodiment will be described. As shown in FIGS. 1 and 2, the horizontal axis wind turbine 1 comprises: a tower 2; a nacelle 3 attached to the top of the tower 2 rotatably in a substantially horizontal plane; a main shaft (not shown) extending in a substantially horizontal direction and pivotally supported on the nacelle 3; a rotor 4 attached to the main shaft rotatably; a plate-like member 5 attached to the top face of the nacelle 3; a yaw sensor 10; anemometers A and B attached to positions that are across the plate-like member 5; a control device 100 for integrating and controlling the whole of the horizontal axis wind turbine 1; and the like.

Figure 2:
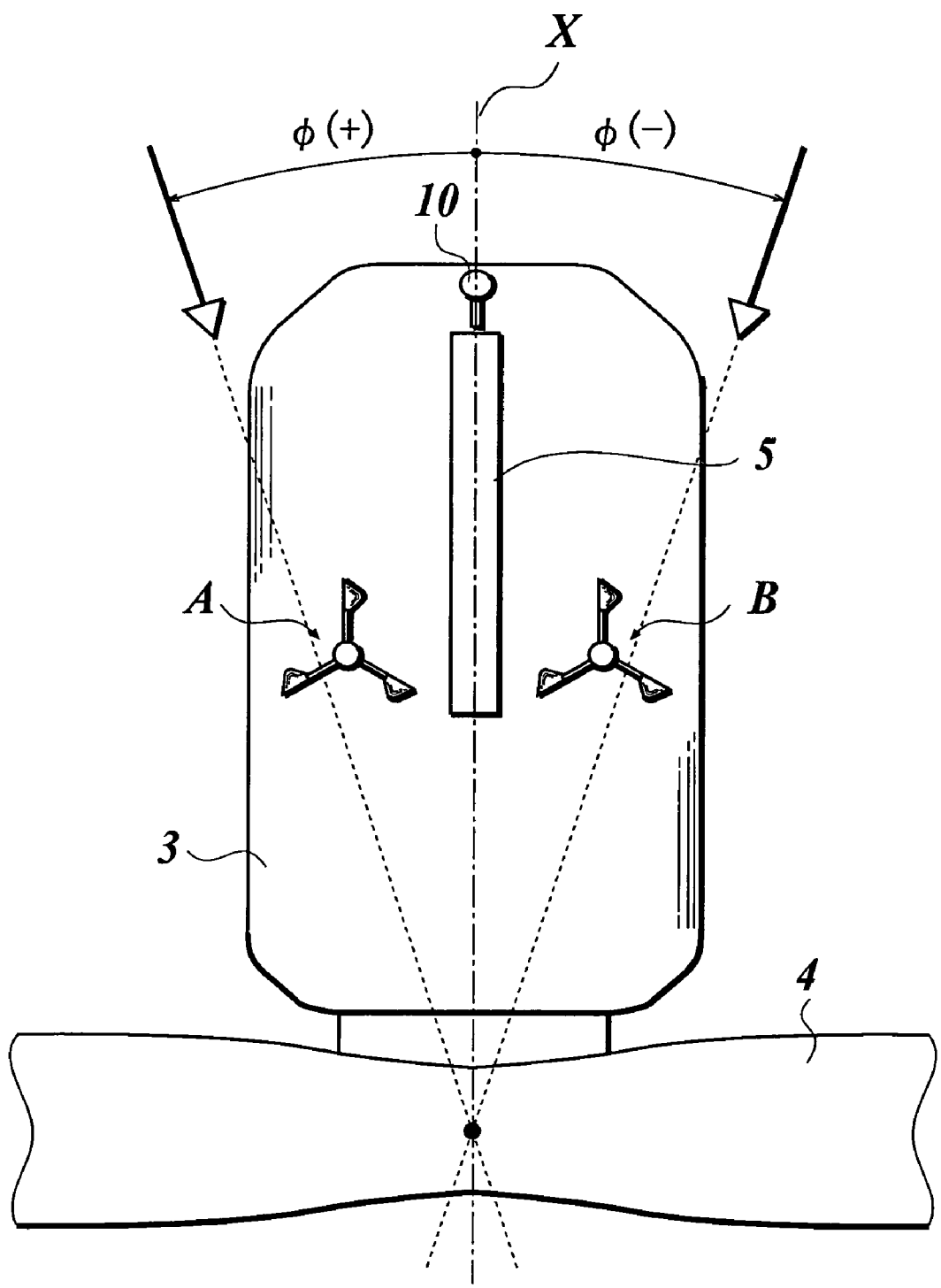
FIG. 2 is a fragmentary enlarged top view for illustrating configuration of the main part of the horizontal axis wind turbine shown in FIG. 1.

The plate-like member 5 is attached to the center in the width direction of the nacelle 3 along the direction of the rotor axis X of the rotor 4 (the direction of the main shaft) and is disposed so as to extend upward vertically (See FIGS. 1 and 2). The plate-like member 5 may be made of metallic material, synthetic resin, or the like. Furthermore, in cases two anemometers are disposed in two sides of nacelle, nacelle itself functions as the plate-like member 5.

The yaw sensor 10 is what measures the direction of the wind (wind direction) blowing against the center of the rotor 4 of the horizontal axis wind turbine 1. The yaw sensor 10 is attached to the top face of the nacelle 3. The wind direction measured by the yaw sensor 10 is used for controlling the yaw angle $\Phi$ of rotor 4 (the angle between the direction of the rotor axis X of the rotor 4 and the wind direction). A wind vane used conventionally may be adopted as the yaw sensor 10.

The anemometer A and the anemometer B are rotation anemometers in which a plurality of cups catch the wind blowing against the rotor center of the horizontal axis wind turbine 1 and the wind speed is measured from the speed thereof. The type of the anemometer A and the anemometer B is not limited in particular. Therefore the type used conventionally (for example, the type of the anemometer manufactured by Vaisala or Thies) may be adopted.

The control device 100 performs a calculation process for calculating a difference (hereinafter, referred to as "wind speed difference") or a ratio (hereinafter, referred to as "wind speed ratio") between a value of the wind speed measured by the anemometer A and a value of the wind speed measured by the anemometer B, an estimation process for estimating the yaw angle $\Phi$ by using the wind speed difference correlation data or the wind speed ratio correlation data, which will be explained below, by executing the predetermined programs for performing the above-described processes. Additionally, the control device 100 controls the yaw angle $\Phi$ of the rotor 4 so as to face to the wind direction measured by the yaw sensor 10 when the yaw sensor 10 is not broken. Whereas, the control device 100 controls the yaw angle $\Phi$ of the rotor 4 based on the wind speeds measured by the anemometer A and the anemometer B when the yaw sensor 10 is broken. That is, the control device 100 is the controller of the present invention. Furthermore, the control device 100 functions as a wind speed difference calculation unit, a wind speed ratio calculation unit, a recording unit, the yaw angle estimation unit, and the yaw control unit of the present invention.

Figure 5:
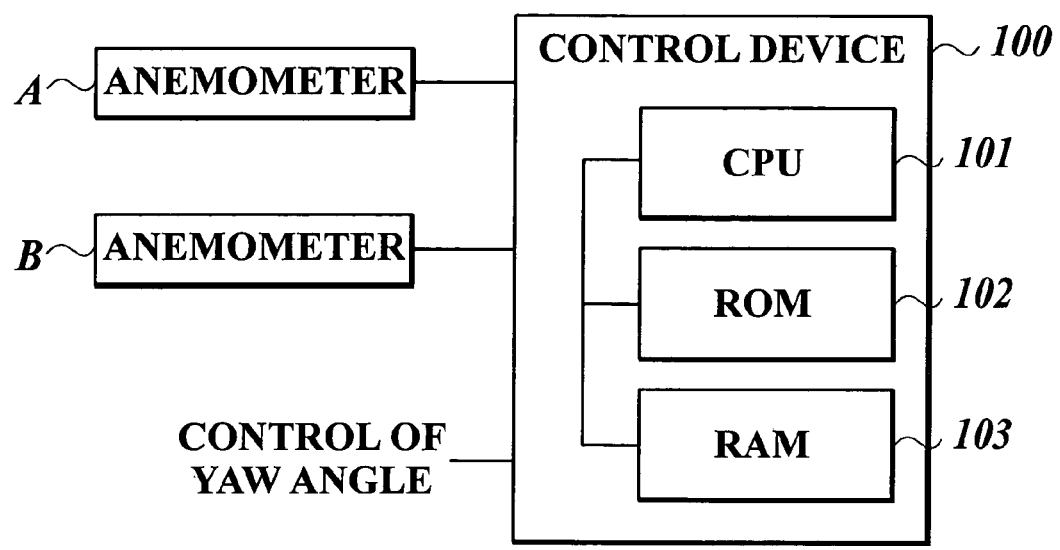
FIG. 5 is a block diagram for illustrating a control device of the horizontal axis wind turbine shown in FIG. 1.

The control device 100 comprises a CPU 101, a ROM 102, and a RAM 103 as shown in FIG. 5. The CPU 101 performs the calculation process, the estimation process, and the like by the predetermined programs. The ROM 102 stores the predetermined programs, the wind speed difference correlation data and the wind speed ratio correlation data. The RAM 103 is used for temporary storing of results in each process and the like.

Secondly the relationship between values of the wind speeds measured by the two anemometers (the anemometer A and the anemometer B) of the horizontal axis wind turbine 1 according to the embodiment of the present invention and the yaw angle $\Phi$ will be described with FIGS. 2 to 4.

The plate-like member 5 is disposed between the anemometer A and the anemometer B in the horizontal axis wind turbine 1. Therefore a difference is made between a value of the wind speed measured by the anemometer A and a value of the wind speed measured by the anemometer B in the case that the wind blows diagonally from the front of rotor 4.

For example, when plus and minus of the yaw angle $\Phi$ are defined as shown in FIG. 2, the effect of the plate-like member 5 makes a value of the wind speed measured by the anemometer A higher than a value the wind speed measured by the anemometer B in the case that the yaw angle $\Phi$ is plus (+), that is, the wind blows from the left side of the rotor axis X of the rotor 4 (the left side of the plate-like member 5). On the other hand, the effect of the plate-like member 5 makes a value of the wind speed measured by the anemometer A lower than a value of the wind speed measured by the anemometer B in the case that the yaw angle $\Phi$ is minus (−), that is, the wind blows from the right side of the rotor axis X (the right side of the plate-like member 5).

Therefore a certain relationship is forged between: the difference (speed difference) or the ratio (speed ratio) between a value of the wind speed measured by the anemometer A and a value of the wind speed measured by the anemometer B; and the yaw angle $\Phi$. In the present embodiment, data according to the relationship between the wind speed difference and the yaw angle $\Phi$ (wind speed difference correlation data) and data according to the relationship between the wind speed ratio and the yaw angle $\Phi$ (wind speed ratio correlation data) are obtained by means of ground-based experiments in advance. The wind speed difference correlation data and the wind speed ratio correlation data are stored in the ROM 102 in the nacelle 3.

Figure 3:
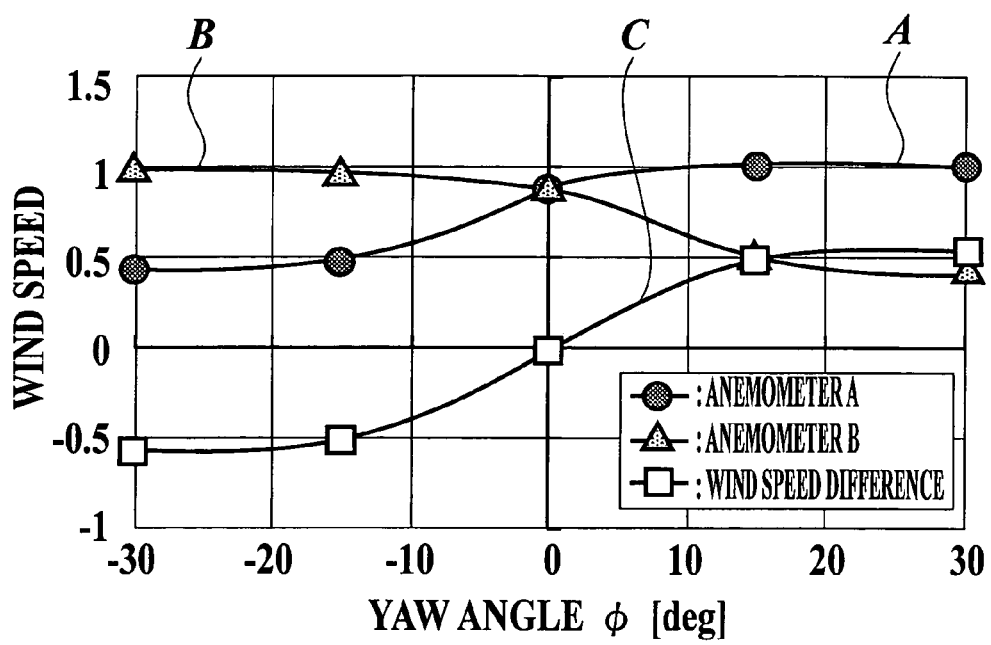
FIG. 3 is a figure showing correlation data of a wind speed difference (a graph showing the relationship between a wind speed difference and the yaw angle) stored in a ROM of the horizontal axis wind turbine shown in FIG. 1.

The graph showing relationship between the difference in the wind speeds and the yaw angle $\Phi$ shown in FIG. 3 may be employed as the wind speed difference correlation data In the graph of FIG. 3, the vertical coordinate is "wind speed" and the horizontal coordinate is "yaw angle $\Phi$ (degree)". Values of "wind speed" of vertical coordinate in FIG. 3 are ratios (dimensionless values) of measured values to the wind speed.

A curve A in FIG. 3 is formed by plotting a point on a graph at the wind speed value measured by the anemometer A in each case that the yaw angle $\Phi$ is "−30 degree", "−15 degree", "0 degree", "15 degree", and "30 degree" and by connecting these points with an approximating curve. The wind speed value measured by the anemometer A becomes the minimum at the yaw angle $\Phi$ of "−30 degree", increases gradually as the yaw angle $\Phi$ changes from a minus to a plus, and converges to "1" (an uniform flow) at the yaw angle $\Phi$ approaching about "15 degree"(see FIG. 3). The reason is that the wind is blocked because the anemometer A lies behind the plate-like member 5 in the case that the yaw angle Φ is minus.

A curve B in FIG. 3 is formed by plotting a point on a graph at the wind speed value measured by the anemometer B in each case that the yaw angle Φ is "−30 degree", "−15 degree", "0 degree", "15 degree", and "30 degree" and by connecting these points with an approximating curve. The wind speed value measured by the anemometer B becomes the minimum at the yaw angle Φ of "30 degree", increases gradually as the yaw angle Φ changes from a plus to a minus, and converges to "1" (an uniform flow) at the yaw angle Φ approaching about "−15 degree" (see FIG. 3). The reason is that the wind is blocked because the anemometer B lies behind the plate-like member 5 in the case that the yaw angle Φ is plus.

That is, the curve A and the curve B are mutually symmetric with respect to the line of "the yaw angle Φ=0 (degree)".

A curve C in FIG. 3 is formed by plotting a point on a graph at a value that is the wind speed value measured by the anemometer A minus the wind speed value measured by the anemometer B (wind speed difference) in each case that the yaw angle Φ is "−30 degree", "−15 degree", "0 degree", "15 degree", and "30 degree" and by connecting these points with an approximating curve. The wind speed difference corresponds to the yaw angle Φ due to the curve C. The yaw angle Φ may be estimated by using the curve C and the wind speed difference calculated from measurement of values of the wind speed by the anemometer A and the anemometer B. For example, if the wind speed difference is "0.5", the yaw angle Φ is estimated at "about 15 degree".

Because it is difficult to provide means for measuring the actual wind speed, the value measured by the anemometer A or the anemometer B may be used as the wind speed. In this case, the control device 100 is made to store data using the values measured by the anemometer A or the anemometer B as a wind speed. A greater value of the values measured by the anemometer A and the anemometer B may be also used as a substitute for the wind speed.

Figure 4:
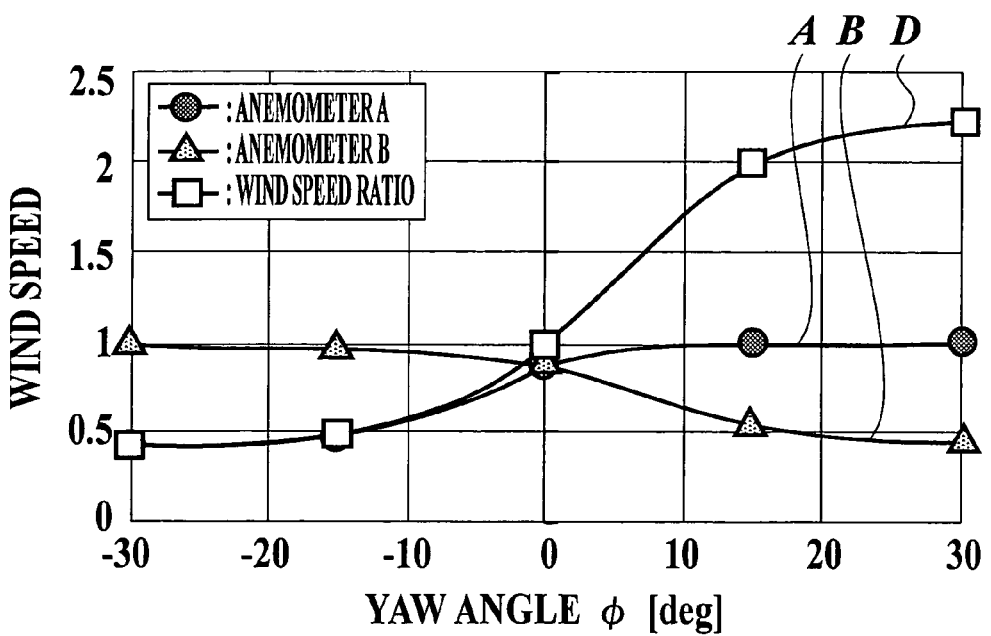
FIG. 4 is a figure showing correlation data of a wind speed difference (a graph showing the relationship between ratio between wind speeds and the yaw angle) stored in a ROM of the horizontal axis wind turbine shown in FIG. 1.

The graph showing relationship between the ratio between the wind speeds and the yaw angle Φ shown in FIG. 4 may be employed as the wind speed ratio correlation data s. In the graph of FIG. 4, the vertical coordinate is "wind speed" and the horizontal coordinate is "yaw angle Φ (degree)". Values of "wind speed" of vertical coordinate in FIG. 4 are ratios (dimensionless values) of measured values to wind speed undisturbed by the wind turbine. A curve A and a curve B in FIG. 4 are the same as the curve A and the curve B in FIG. 3 (only the scale of the vertical coordinate is changed).

A curve D in FIG. 4 is formed by plotting a point on a graph at a value that equals the wind speed value measured by the anemometer A divided by the wind speed value measured by the anemometer B (wind speed ratio) in each case that the yaw angle Φ is "−30 degree", "−15 degree", "0 degree", "15 degree", and "30 degree" and by connecting these points with an approximating curve. The wind speed ratio corresponds to the yaw angle Φ due to the curve D. The yaw angle Φ may be estimated by using the curve D and the wind speed ratio calculated from measurement of values of the wind speed by the anemometer A and the anemometer B. For example, if the wind speed ratio is "2", the yaw angle Φ is estimated at "about 15 degree"(see FIG. 4).

Hereinbelow, a method for controlling the yaw angle of the rotor 4 in the case of a breakdown of the yaw sensor of the horizontal axis wind turbine 1 will be described.

The control device 100 of the horizontal axis wind turbine 1 calculates the difference (wind speed difference) between a value of the wind speed measured by the anemometer A and a value of the wind speed measured by the anemometer B (step for calculating the wind speed difference). Then the control device 100 estimates the yaw angle Φ by using the curve C of the graph showing relationship between the difference in the wind speeds and the yaw angle Φ (see FIG. 3) stored in the ROM 102, and the wind speed difference calculated in the step for calculating a wind speed difference (step for estimating the yaw angle).

The control device 100 rotates the rotor axis X of the rotor 4 based on the yaw angle Φ estimated in the step for estimating the yaw angle. Concretely speaking, in the case that the yaw angle Φ is plus (+), that is, in the case that a value of the wind speed measured by the anemometer A is higher than a value of the wind speed measured by the anemometer B since the wind blows from the left side of the plate-like member 5, the rotor axis X of the rotor 4 is rotated to the anemometer A in such a way that the yaw angle Φ becomes 0 degree. Thus when the yaw angle approaches about 0 degree (when the rotor 4 faces nearly to the wind direction), the rotor is stopped.

On the other hand in the case that the yaw angle Φ is minus (−), that is, in the case that a value of the wind speed measured by the anemometer B is higher than a value of the wind speed measured by the anemometer A since the wind blows from the right side of the plate-like member 5, the rotor axis X of the rotor 4 is rotated to the anemometer A in such a way that the yaw angle Φ converges to 0 degree. Thus when the yaw angle Φ approaches about 0 degree, the rotor is stopped (step for controlling the yaw angle).

A step for calculating the ratio (wind speed ratio) between values of the wind speed measured by the anemometers A and B (step for calculating the wind speed ratio) may be adopted instead of the step for calculating a wind speed difference. In this case, the control device 100 estimates the yaw angle Φ with the curve D of the graph showing the relationship between the ratio between the wind speeds and the yaw angle Φ (see FIG. 4) stored in the ROM 102, and with the wind speed ratio calculated in the step for calculating the wind speed ratio.

In the horizontal axis wind turbine 1 relating the above-described embodiment, the plate-like member 5 extending in the direction of the rotor axis X of the rotor 4 and the vertical direction is disposed at the central portion (a hub) of rotation of the rotor 4. The anemometer A and the anemometer B is disposed at positions that are across the plate-like member 5. Therefore it is possible to make a difference between the wind speeds measured by the anemometer A and the anemometer B in the case that the rotor 4 does not face opposite the wind direction. The control device 100 estimates the yaw angle Φ based on the difference (or the ratio) between the wind speeds measured thus by the anemometer A and the anemometer B. The control device 100 rotates the rotor axis X of the rotor 4 in such a way that the yaw angle Φ converges to 0 degree (the rotor 4 faces opposite the wind direction).

Accordingly even if the yaw sensor is broken down, it is possible to make the rotor 4 face to the wind direction by using of the anemometer A and the anemometer B. Also in the case of a breakdown of either anemometer, it is possible that the wind speed is measured by the other anemometer because of adoption of two anemometers (the anemometer A and the anemometer B). Consequently in spite of a simple and inexpensive configure, it is possible to exert the same effect as the case of employing two yaw sensors and two anemometers and obviate the stop of power generation action caused by a breakdown of a yaw sensor or an anemometer.

The above-described embodiment adopts the control law (control logic) of estimating the yaw angle Φ by using the correlation data of the difference or the ratio between the wind speeds and rotating the rotor axis X in such a way that the yaw angle Φ converges to 0 degree. Meanwhile it is also possible to perform control of the yaw angle Φ of the rotor 4 referring only values of the wind speed measured by the anemometer A and the anemometer B.

For example, whether the difference (wind speed difference) between a value measured by the anemometer A and a value measured by the anemometer B is more than a predetermined threshold or not is determined (a step for determining the wind speed deference). If the wind speed difference is not more than the threshold, it is determined that the rotor 4 faces to the wind direction, and then the control finishes. Meanwhile if the wind speed difference is beyond said threshold, the rotor axis X is rotated to the anemometer measuring a higher value than the other anemometer. Then the wind speed difference falls not more than the threshold, it is determined that the rotor 4 faces to the wind direction, and then the rotor 4 is stopped (step for yaw control).

As for the above-described control, whether the rotor axis X is rotated or not is determined based on the wind speed difference. However a value for determining whether the rotor axis X is rotated or not, which is referred to as a control determination value, is not limited to the wind speed difference or ratio.

Adoption of the control law(control logic) makes it possible that yaw control with a very simple control law(control logic) using values of wind speeds measured by two anemometers (the anemometer A and the anemometer B), without using correlation data of the difference between wind speeds or correlation data of the ratio between wind speeds, and without a step for estimating the yaw angle.

In addition, as for the embodiment of the present invention, the wind speed difference or ratio may be replaced by a value calculated from the wind speeds by such a suitable function as a logarithmic function or a suitable combination of functions.

The entire disclosure of Japanese patent Applications No. Tokugan 2003-288936 filed on Aug. 7, 2003 including specification, claims, drawings and summary are incorporated herein by reference in its entirety.

What is claimed is:

1. A horizontal axis wind turbine comprising:
    a yaw sensor;
    a rotor rotating around a rotor axis extending in a substantially horizontal direction, the rotor axis rotating in a substantially horizontal plane depending on yaw angle;
    a plate-like member disposed on a rotational central portion of the rotor and extending in a parallel direction to the rotor axis and in a vertical direction;
    two anemometers disposed at positions which are across the plate-like member; and
    a controller for yaw control based on wind speeds measured by the two anemometers.

2. The wind turbine as claimed in claim 1, wherein the controller estimates a yaw angle of the rotor based on the difference or the ratio between the wind speeds measured by the two anemometers, and rotates the rotor axis so that the estimated yaw angle converges to about 0 degree.

3. A method for controlling the wind turbine as claimed in claim 1, the method comprising:
    estimating the yaw angle based on the wind speeds measured by the two anemometers; and
    rotating the rotor axis so that the estimated yaw angle converges to about 0 degree.

4. A method for controlling the wind turbine as claimed in claim 1, the method comprising:
    determining whether the difference between the wind speeds measured by the two anemometers is more than a predetermined threshold or not;
    rotating the rotor axis to one anemometer which measures a higher wind speed than other anemometer when the difference between the wind speeds exceeds the threshold; and
    stopping rotation of the rotor axis when the difference between the wind speeds falls not more than the threshold.

5. A horizontal axis wind turbine comprising:
    a rotor for rotating around a rotor axis extending in a substantially horizontal direction;
    two anemometers;
    a parting member disposed so that wind speeds measured by the anemometers are different except when a yaw angle of the rotor is substantially 0 degree; and
    a controller for controlling the yaw angle of the rotor based on the wind speeds measured by the two anemometers.

6. The wind turbine as claimed in claim 5, further comprising a yaw sensor.

7. The wind turbine as claimed in claim 5, wherein the parting member is a plate-like member.

8. The wind turbine as claimed in claim 5, wherein the controller controls the yaw angle based on a difference between the wind speeds measured by the two anemometers.

9. The wind turbine as claimed in claim 5, wherein the controller controls the yaw angle of the rotor based on a ratio between the wind speeds measured by the two anemometers.

10. The wind turbine as claimed in claim 5, wherein the controller compares the wind speeds measured by the two anemometers and rotates the rotor axis to one anemometer which measures a higher wind speed than other anemometer.

11. The wind turbine as claimed in claim 5, wherein the controller calculates a control determination value from the wind speeds measured by the two anemometers, determines whether the control determination value is within a predetermined range or not, rotates the rotor axis to an anemometer which measures a higher wind speed than other anemometer when the control determination value is out of the predetermined range, and stops rotation of the rotor axis when the control determination value comes within the range.

12. The wind turbine as claimed in claim 11, wherein a difference or a ratio between wind speeds measured by the two anemometers is used as the control determination value.

13. The wind turbine as claimed in claim 5, wherein the controller estimates the yaw angle of the rotor based on the wind speeds measured by the two anemometers, and rotates the rotor axis so that the estimated yaw angle converges to about 0 degree.

14. The wind turbine as claimed in claim 5, wherein the controller comprises:
    a wind speed difference calculation unit for calculating a wind speed difference from wind speeds measured by the two anemometers;

a recording unit for recording wind speed difference correlation data showing relationship between the wind speed difference and the yaw angle;

a yaw angle estimation unit for estimating the yaw angle by using the wind speed difference calculated by the wind speed difference calculation unit and the wind speed difference correlation data recorded in the recording unit; and a yaw control unit for rotating the rotor axis so that the estimated yaw angle converges to about 0 degree.

15. The wind turbine as claimed in claim 5, wherein the controller comprises:

a wind speed ratio calculation unit for calculating a wind speed ratio from wind speeds measured by the two anemometers;

a recording unit for recording wind speed ratio correlation data showing relationship between the wind speed ratio and the yaw angle;

a yaw angle estimation unit for estimating the yaw angle by using the wind speed ratio calculated by the wind speed ratio calculation unit and the wind speed ratio correlation data recorded in the recording unit; and a yaw control unit for rotating the rotor axis so that the estimated yaw angle converges to about 0 degree.

16. A method for controlling the wind turbine as claimed in claim 5, the method comprising:

comparing the wind speeds measured by the two anemometers; and rotating the rotor axis to an anemometer which measures a higher wind speed than other anemometer.

17. A method for controlling the wind turbine as claimed in claim 5, the method comprising:

calculating a control determination value from wind speeds measured by the two anemometers;

determining whether the control determination value is within a predetermined range or not;

rotating the rotor axis to an anemometer which measures a higher wind speed than other anemometer when the control determination value is out of the predetermined range; and stopping rotation of the rotor axis when the control determination value comes in the range.

18. The method for controlling the wind turbine as claimed in claim 17, wherein a difference or a ratio between wind speeds measured by the two anemometers is used as the control determination value.

19. A method for controlling the wind turbine as claimed in claim 5, the method comprising:

measuring the wind speeds by the two anemometers;

calculating a wind speed difference from the wind speeds measured by the two anemometers;

estimating the yaw angle by using the wind speed difference calculated by the wind speed difference calculation unit and wind speed difference correlation data showing relationship the wind speed difference and the yaw angle; and rotating the rotor axis so that the estimated yaw angle converges to about 0 degree.

20. A method for controlling the wind turbine as claimed in claim 5, the method comprising:

measuring the wind speeds by the two anemometers;

calculating a wind speed ratio from the wind speeds measured by the two anemometers;

estimating the yaw angle by using the wind speed ratio calculated by the wind speed ratio calculation unit and wind speed ratio correlation data showing relationship the wind speed ratio and the yaw angle; and rotating the rotor axis so that the estimated yaw angle converges to about 0 degree.

* * * * *